No. 806,901. PATENTED DEC. 12, 1905.
S. P. MENDENHALL.
IRRIGATING SYSTEM.
APPLICATION FILED MAR. 22, 1905.
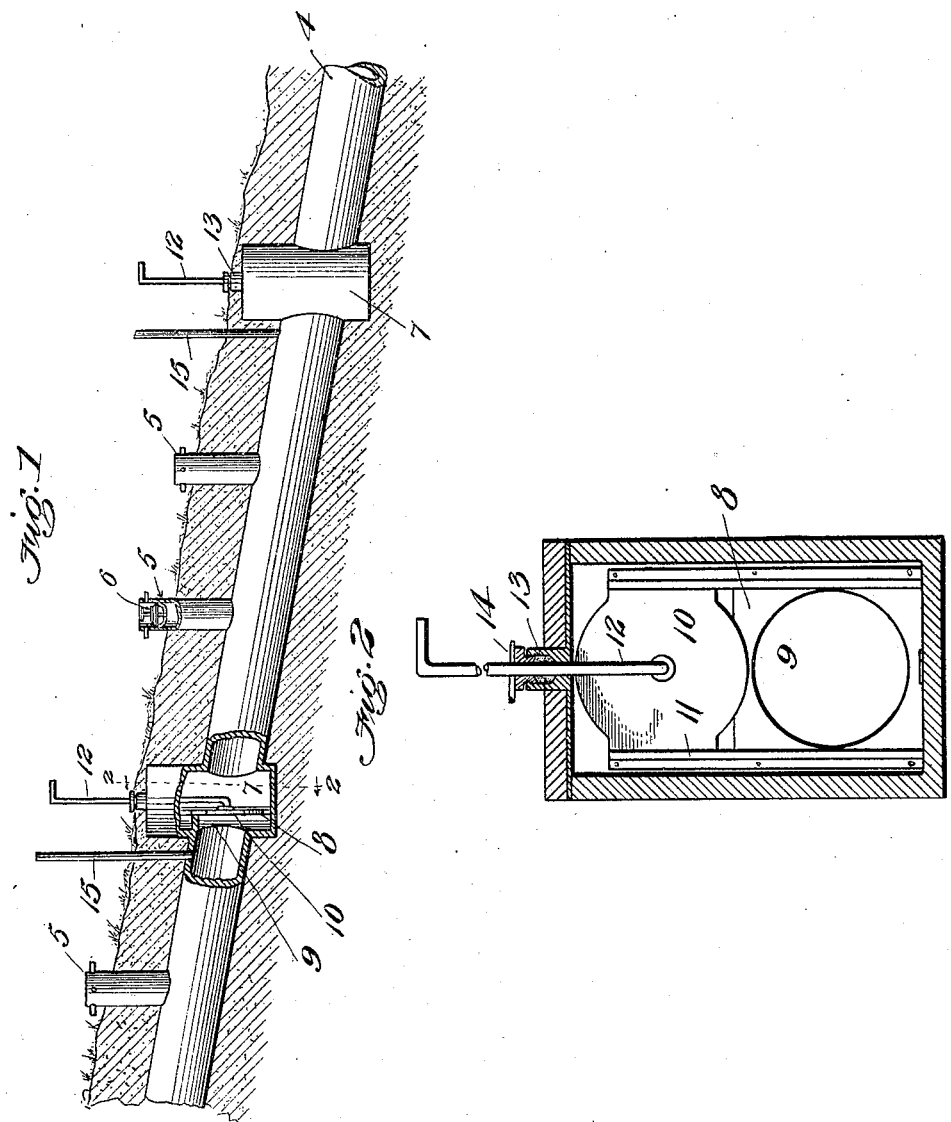
Witnesses
Inventor
Samuel P. Mendenhall
by Hazard & Harpham
Attorneys.

UNITED STATES PATENT OFFICE.

SAMUEL P. MENDENHALL, OF WHITTIER, CALIFORNIA, ASSIGNOR OF ONE-HALF TO J. M. TAYLOR, OF WHITTIER, CALIFORNIA.

IRRIGATING SYSTEM.

No. 806,901. Specification of Letters Patent. Patented Dec. 12, 1905.

Application filed March 22, 1905. Serial No. 251,501.

*To all whom it may concern:*

Be it known that I, SAMUEL P. MENDENHALL, a citizen of the United States, residing at Whittier, in the county of Los Angeles and State of California, have invented new and useful Improvements in Irrigating Systems, of which the following is a specification.

My invention relates to a system for irrigating land that has a considerable grade; and the object thereof is to provide an irrigating system in which the flow of the water can be regulated evenly at all the outlets. I accomplish this object by means of the system described herein and illustrated in the accompanying drawings, in which—

Figure 1 is a side view, partly in elevation and partly in section, of a pipe-line with outlets and regulating-gates and air-vents thereon with the ground in section. Fig. 2 is a section on the line 2 2 of Fig. 1 looking toward the upper end of the pipe-line.

In the drawings, 4 is an underground irrigating-line, which is provided at suitable distances with outlet stand-pipes 5, which are provided with valves 6 to regulate the quantity of water permitted to flow from the irrigating-line. On the irrigating-line at suitable distances apart are gate-chambers 7, through which the irrigating-line passes. In these gate-chambers are partitions 8, which divide the chamber into two parts or chambers. Into the upper chamber the water is received. An aperture 9, of substantially the same capacity as the irrigating-line, is provided in the partitions in register with the channel of the irrigating-line. This aperture is controlled by gate 10, which is vertically movable in guideways 11, secured to the partitions. The gate is provided with a stem 12, which passes upwardly through the top of the gate-chamber and is provided with a gland 13, which makes the joint water-tight around the stem. Pins 14 are passed through the stem to regulate the height at which the gate stands when opened for irrigating purposes. On the upper side of the gate-chambers are vent-pipes 15, which prevent the air from being trapped in the line and also serve as a means for determining the position at which the gate in the gate-chambers shall be set. These vent-pipes are of such a height above the surface of the ground that when the water just comes to the top thereof it indicates that there is the requisite pressure in the pipe-line above such vent-pipe to supply the stand-pipes with the amount of water which is required to flow therefrom for the proper irrigation of the soil. These vent-pipes will also indicate when there is too great pressure on the irrigating-line by the height to which the water is thrown from them, and the flow can then be regulated at the head gate. (Not shown.)

It will be understood that on the irrigating-line the gate-chambers are placed closer together or farther apart as the grade of the land varies and that these chambers are water-tight. It is also understood that the valves used to regulate the flow of water from the irrigating-line to stand-pipes are of such character that they can be closed to prevent any flow of water from the irrigating-line.

Having described my invention, what I claim as new, and desire to secure by Letters Patent, is—

1. In an underground irrigating system, an irrigating-line; a plurality of gate-chambers on said irrigating-line having a closed top, each of said gate-chambers having a partition therein with an aperture therethrough; a gate in each of said chambers having a stem projecting through the top of said chamber and above the surface of the ground; a plurality of stand-pipes intermediate said gate-chambers connected with said irrigating-line; and means in said stand-pipes to cut off the whole or a part of the flow through said stand-pipes.

2. In an underground irrigating system, an irrigating-line; a plurality of gate-chambers on said irrigating-line having a closed top, each of said gate-chambers having a partition therein with an aperture therethrough; a gate in each of said chambers having a stem projecting through the top of said chamber and above the surface of the ground; a vent-pipe adjacent to said gate-chamber connected with said irrigating-line and on that side of the gate-chamber toward the water-supply; a plurality of stand-pipes intermediate said gate-chambers connected with said irrigating-line; and means in said stand-pipes to cut off the whole or a part of the flow through said stand-pipes.

In witness that I claim the foregoing I have hereunto subscribed my name this 15th day of March, 1905.

SAMUEL P. MENDENHALL.

Witnesses:
 NINA H. TABER,
 J. E. NICHOLSON.